(12) United States Patent
Pearce

(10) Patent No.: US 8,014,947 B2
(45) Date of Patent: Sep. 6, 2011

(54) METHOD AND SYSTEM OF LOCATING PRINTOUTS

(75) Inventor: Chris Pearce, Dallas, TX (US)

(73) Assignee: Cisco Technology, Inc., San Jose, CA (US)

( * ) Notice: Subject to any disclaimer, the term of this patent is extended or adjusted under 35 U.S.C. 154(b) by 1194 days.

(21) Appl. No.: 11/692,789

(22) Filed: Mar. 28, 2007

(65) Prior Publication Data

US 2008/0243379 A1    Oct. 2, 2008

(51) Int. Cl.
*G01C 21/30* (2006.01)
(52) U.S. Cl. .......... 701/209; 358/1.15
(58) Field of Classification Search .......... 358/1.15; 701/208, 209
See application file for complete search history.

(56) References Cited

U.S. PATENT DOCUMENTS

| | | | |
|---|---|---|---|
| 4,546,439 A | 10/1985 | Esparza | 364/444 |
| 5,197,009 A | 3/1993 | Hoffman et al. | 364/443 |
| 5,809,265 A | 9/1998 | Blair et al. | 395/339 |
| 6,246,376 B1 | 6/2001 | Bork et al. | 343/760 |
| 6,452,692 B1 * | 9/2002 | Yacoub | 358/1.15 |
| 6,665,712 B2 | 12/2003 | Pickup | 709/219 |
| 6,996,611 B1 | 2/2006 | Muto | 709/223 |
| 7,242,491 B2 * | 7/2007 | Nakayasu et al. | 358/1.15 |
| 2008/0204789 A1* | 8/2008 | Hooglander | 358/1.15 |
| 2010/0144272 A1* | 6/2010 | Blight et al. | 455/41.2 |

* cited by examiner

*Primary Examiner* — John Q Nguyen
*Assistant Examiner* — Brian J Broadhead
(74) *Attorney, Agent, or Firm* — Baker Botts L.L.P.

(57) ABSTRACT

Methods and apparatus for locating printouts are provided. In a method embodiment, a method of providing information generally includes generating directions to a first printer from a first location based on the location of the first printer and the first location. The method also includes presenting the directions to a user.

23 Claims, 2 Drawing Sheets

METHOD AND SYSTEM OF LOCATING PRINTOUTS

TECHNICAL FIELD

This disclosure relates in general to providing directions and, in particular, to a method and system of locating printouts of a printer.

BACKGROUND

Large networks typically use network printers for converting electronic data into paper form. Some of these network printers may have different capabilities. Users of large networks typically may connect to several different printers at a time. When a user sends a particular print command through the network, it is not always easy to determine the physical location of the printout.

SUMMARY OF THE EXAMPLE EMBODIMENTS

In a method embodiment, a method of providing information generally includes generating directions to a first printer from a first location based on the location of the first printer and the first location. The method also includes presenting the directions to a user.

Technical advantages of some embodiments of the disclosure may include enhanced methods and systems for providing directions to a user in response to a trigger. Various embodiments may respond to a print command by determining the starting and ending addresses and rendering the results to a user in the form of directions that may be hand carried by the user.

It will be understood that the various embodiments of the present disclosure may include some, all, or none of the enumerated technical advantages. In addition other technical advantages of the present disclosure may be readily apparent to one skilled in the art from the figures, description, and claims included herein.

BRIEF DESCRIPTION OF THE DRAWINGS

For a more complete understanding of the present disclosure and features and advantages thereof, reference is now made to the following description, taken in conjunction with the accompanying drawings, in which.

DESCRIPTION OF EXAMPLE EMBODIMENTS

According to the teachings of the present disclosure, methods and apparatus for locating printouts are provided. Various embodiments may provide directions to a user in response to a trigger. Particular examples specified throughout this document are intended for example purposes only, and are not intended to limit the scope of the present disclosure. In particular, this document is not intended to be limited to a particular locator application, such as, a printer locator application.

Figure 1:
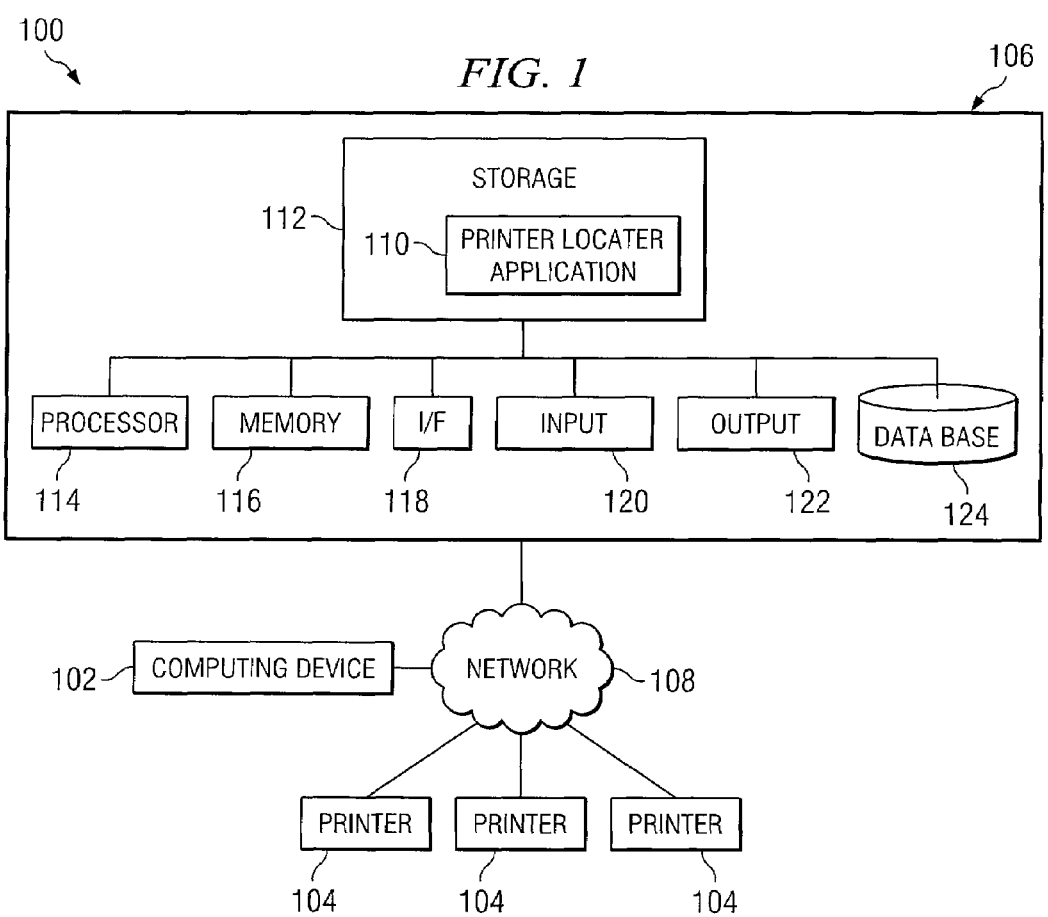
FIG. 1 is a network system according to one embodiment of the present disclosure.

FIG. 1 is a block diagram of a system 100 that generally includes a computing device 102 and multiple printers 104 connected to a server 106 through a network 108 according to one embodiment of the present disclosure. A locator application 110, residing in storage 112 on server 106, is generally operable to provide a map to a user in response to a trigger; however, all or a portion of locator application 110 may alternatively or additionally reside in other locations, such as, for example, within storage of computing device 102. The trigger may be, for example, a directory search or a contact list search. In the example embodiment, however, the trigger is a print command. As explained further below, in the example embodiment, locator application 110 may respond to the print command by determining the starting and ending addresses and rendering the results to a user in the form of directions.

Computing device 102 generally refers to any suitable device operable to communicate with server 106 through network 108. For example, computing device 102 may be operable to send a request for directions, or a print command, to server 106 through network 108. In addition, computing device 102 may also receive directions corresponding to the location of a printout executed by a particular printer 104. The communication between computing device 102 and server 106 may be effected, for example, via wireless or hardwired connectivity. In this particular embodiment, computing device 102 may be further operable to install drivers for printers 104, which may include location information corresponding to printers 104. In addition, computing device 102 may be further operable to derive its current location, as explained further below with reference to FIG. 3.

Examples of a suitable computing device 102 include a computer such as a desktop or a laptop, a personal digital assistant, a mobile phone, and the like. Computing device 102 may execute with any of the well-known MS-DOS, PC-DOS, OS-2, MAC-OS, WINDOWS™, UNIX, or other appropriate operating systems, including future operating systems.

Printers 104 generally refer to any device operable to execute print commands received from server 106 through network 108. In various embodiments, locator application 110 may be operable to derive printer 104 locations relative to floor a plan, as explained further below with reference to FIG. 3.

Server 106 may be, for example, a file server, a domain name server, a proxy server, a web server, a computer workstation, or any other device operable to communicate with computing device 102 and printers 104 through network 108. In the example embodiment, server 106 can act as a DHCP server for managing network printers 104. Server 106 may execute with any of the well-known MS-DOS, PC-DOS, OS-2, MAC-OS, WINDOWS™, UNIX, or other appropriate operating systems, including future operating systems. Server 106 typically includes a processor 114, memory 116, an interface 118, input functionality 120, output functionality 122, and database 124; however, server 106 may be any appropriate server type. In the example embodiment, database 124 resides within server 124; however, database 124 may alternatively reside separate from server 124. Database 124 stores data, and facilitates addition, modification, and retrieval of such data.

Network 108 may refer to any interconnecting system capable of transmitting audio, video, signals, data, messages, or any combination of the preceding. Network 108 may comprise all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

Figure 2:
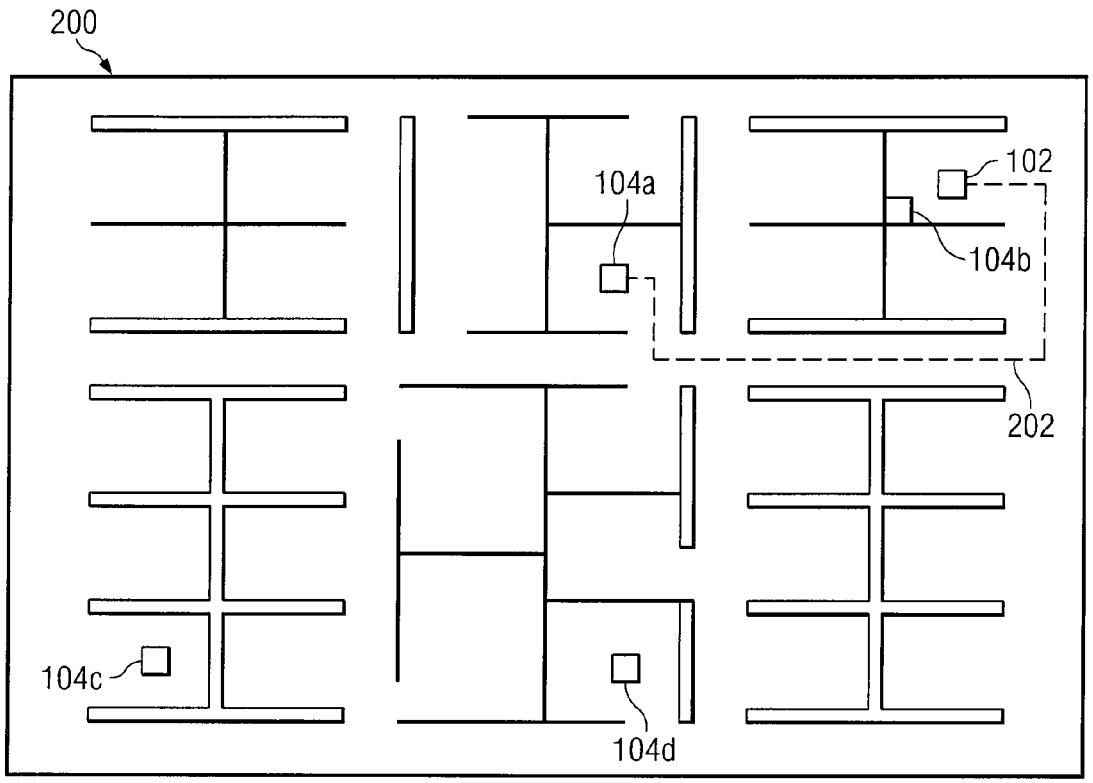
FIG. 2 is a floor map giving directions between components of the network system of FIG. 1.

FIG. 2 illustrates example directions 200 to an executed printout that may be provided to a user of the system 100 of FIG. 1. In the example embodiment, directions 200 include a path 202 from a computing device 102 to the executed printout located at printer 104a. As shown in FIG. 2, directions 200 are illustrated in reference to a particular floor plan of a building. For illustrative purposes, directions 200 also indicate the locations of other printers 104b, 104c, and 104d relative to the floor plan.

In various embodiments, directions 200 may be presented to a user on a display of computing device 102. For example, directions 200 may be presented on a liquid crystal display (LCD) screen of a computer laptop or a handheld device. In some embodiments, computing device 102 may be operable to update its location relative to directions 200 as a user progresses toward the printout location while carrying computing device 102. In some embodiments, directions 200 may be printed at a default printer 104b conveniently located near the location of computing device 102. In this manner, a user may leave computing device 102 while following printed path 202 to a printout.

Although the directions described in the example embodiment are map-based, various other embodiments may present additional directions to a user. For example, some embodiments may present text-based or audio-based directions corresponding to the map.

As shown in FIG. 2, directions 200 include the location of multiple printers 104a, 104b, 104c, and 104d. In various embodiments, locator application 110 may select a particular printer from among a plurality of printers 104b, 104c, and 104d. The selection criteria may include, for example, proximity of the printer to a user, as determined by the location of computing device 102 relative to printers 104. As another example, the selection criteria may include the particular capabilities of each printer 104. Additional example details regarding locator application 110 are provided with reference to FIG. 3.

Figure 3:
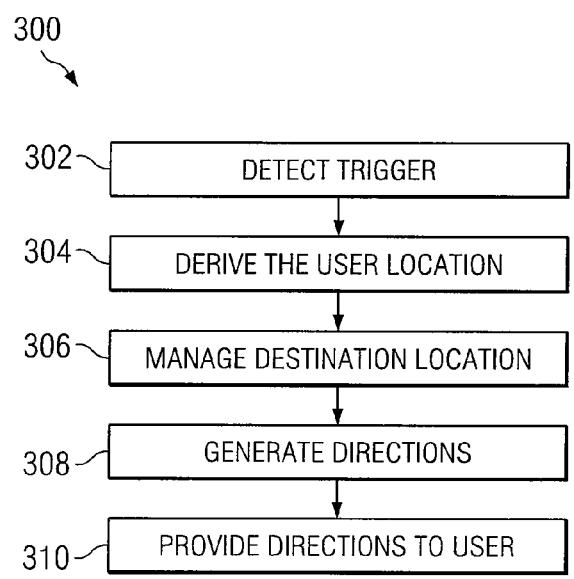
FIG. 3 is a flow chart illustrating acts related to providing directions to a user performed by one embodiment of certain modules of the locator application of FIG. 1.

FIG. 3 is a flow chart 300 illustrating acts related to providing directions to a user by one embodiment of certain modules of the locator application 110 of FIG. 1. Flowchart 300 begins at block 302, where locator application 110 detects a trigger. In the example embodiment, the trigger is a print command.

Locator application 110 derives the user location in block 304. Deriving the user location may be effected by any of a variety of methods. For example, locator application 110 may cause computing device 102 to derive and communicate its location dynamically using radio triangulation or global positioning system (GPS) technologies. In some embodiments, dynamic methods may be preferable if computing device 102 is mobile. In various embodiments, locator application 110 may cause computing device 102 to communicate a static location corresponding, for example, to a particular network node or address. In some embodiments, static methods may be preferable if computing device is less mobile or immobile. In the example embodiment, computing device 102 may derive a current geographic location relative to a particular building floor plan.

Locator application 110 manages destination locations in 306. In the example embodiment, each destination location corresponds to the location of a respective printer 104. Managing destination locations may include correlating printer 104 locations relative to the user location, which may be effected by any of a variety of means.

For example, each printer 104 may have a current geographic location relative to a particular floor plan that is accessible by locator application 110. A server 106 may maintain a list of well-formatted and statically configured geographic locations for printers 104 that is stored, for example, in database 124. Database 124 may index the geographic locations, for example, using Internet Protocol (IP) address. Locator application 110 may include an interface that allows an administrator to access, update, and otherwise manage geographic locations stored in database 124 as needed. Alternatively, the geographic locations for printers 104 may be contained in printer drivers stored in computing device 102. Various other embodiments may derive the geographic locations of printers 104 dynamically, using technologies described previously with reference to computing device 102. Locator application 110 may access and correlate the geographic locations of printers 104 to determine the closest printer 104 to computing device 102 that is operable to execute the particular print command.

In block 308, locator application 110 generates directions from the user location to the destination. In the example embodiment, the user location is determined from the derived location of the computing device 102. The destination is the location of the printer 104 that executed the print command.

Locator application 110 provides directions to the user in block 310. The directions may be provided using any of a variety of methods. For example, as explained previously with reference to FIG. 2, the directions may be presented to a user on a display or in paper form. Some embodiments may provide graphical-based, text-based, and/or audio-based directions to a user.

Although the present disclosure has been described in several embodiments, a myriad of changes, variations, alterations, transformations, and modifications may be suggested to one skilled in the art, and it is intended that the present disclosure encompass such changes, variations, alterations, transformations, and modifications as falling within the spirit and scope of the appended claims.

What is claimed is:

1. A method of providing information, comprising:
    detecting a first print command;
    in response to the detected first print command, selecting a first printer from among a plurality of printers based at least in part on:
        the location of the first printer relative to a first location; and
        a determination that the first printer is configured to execute the first print command;
    generating a map to the first printer from the first location based on the location of the first printer and the first location;
    initiating a communication of the map to a computing device operable to present the map to a user; and
    in response to the detected print command, initiating a second print command to a second printer of the plurality of printers, the second print command being a command to print the map, the distance between the location of the second printer and the first location being less than the distance between the location of the first printer and the first location, wherein the second printer is not configured to execute the first print command.

2. The method of claim 1, wherein the first location is the location of the computing device.

3. The method of claim 1, and further comprising:
    generating second directions to the first printer from the first location based on the location of the first printer and the first location; and communicating the second directions to the computing device, the second directions selected from the group consisting of:
text-based directions; and
audio-based directions.

4. The method of claim 1, and further comprising displaying the map to the user using the computing device.

5. The method of claim 1, wherein the computing device is a mobile device.

6. The method of claim 5, wherein the mobile device is selected from the group consisting of:
personal digital assistant;
mobile phone;
Smartphone;
global positioning satellite handheld;
handheld game console;
ultra-mobile personal computer;
handheld television; and
computer laptop.

7. The method of claim 1, and further comprising determining the location of the computing device.

8. The method of claim 1, and further comprising determining the location of the first printer.

9. The method of claim 8, wherein determining the location of the first printer comprises accessing a table storing information corresponding to the location of the first printer.

10. The method of claim 8, wherein determining the location of the first printer comprises dynamically triangulating the geospatial location of the first printer.

11. A system for providing information comprising:
a printer locator application stored in computer-readable media, the printer locator application operable to:
detect a first print command;
respond to the detected first print command by selecting a first printer from among a plurality of printers based at least in part on:
the location of the first printer relative to the location of a computing device; and
a determination that the first printer is configured to execute the first print command;
generate a map to the first printer from a computing device based on the location of the first printer and the location of the computing device;
initiate a communication of the map for receipt by the computing device; and
respond to the detected first print command by initiating a second print command for printing the map at a second printer of the plurality of printers, the distance between the location of the second printer and the first location being less than the distance between the location of the first printer and the first location, wherein the second printer is not configured to execute the first print command.

12. A method of providing information, comprising:
detecting a first print command;
in response to the detected first print command, selecting a first printer from among a plurality of printers based at least in part on:
the location of the first printer relative to a first location; and
a determination that the first printer is configured to execute the first print command;
generating a map to the first printer from the first location based on the location of the first printer and the first location;
initiating a communication of the map to a computing device operable to present the map to a user;
selecting a second printer from among the plurality of printers based at least in part the location of the second printer relative to the first location, the distance between the location of the second printer and the first location being less than the distance between the location of the first printer and the first location, wherein the second printer is not configured to execute the first print command; and
initiating a second print command for printing the map at the second printer.

13. A method of providing information, comprising:
determining the location of a computing device;
detecting a first print command;
in response to the detected first print command, selecting a first printer from among a plurality of printers based at least in part on:
the location of the computing device; and
a determination that the first printer is configured to execute the first print command;
generating a map to the first printer from the computing device based on the location of the first printer and the location of the computing device;
communicating the map to the computing device;
selecting a second printer from among the plurality of printers based at least in part the location of the second printer relative to the first location, the distance between the location of the second printer and the first location being less than the distance between the location of the first printer and the first location, wherein the second printer is not configured to execute the first print command; and
initiating a second print command for printing the map at the second printer.

14. The method of claim 13, wherein the computing device is a mobile device.

15. The method of claim 13, and further comprising:
generating second directions to the first printer from the computing device based on the location of the first printer and the location of the computing device, the second directions selected from the group consisting of:
text-based directions; and
audio-based directions; and
communicating the second directions to the computing device.

16. A method of providing information, comprising:
determining the location of a computing device;
detecting a first print command;
in response to the detected first print command, selecting a first printer from among a plurality of printers based at least in part on:
the location of the computing device; and
a determination that the first printer is configured to execute the first print command;
generating a map to the first printer from the computing device based on the location of the first printer and the location of the computing device;
communicating the map to the computing device; and
in response to the detected print command, initiating a second print command to a second printer of the plurality of printers, the second print command being a command to print the map, the distance between the location of the second printer and the first location being less than the distance between the location of the first printer and the first location, wherein the second printer is not configured to execute the first print command.

17. A system for providing information comprising:
a printer locator application stored in computer-readable media, the printer locator application operable to:
  detect a first print command;
  respond to the detected first print command by selecting a first printer from among a plurality of printers based at least in part on:
    the location of the first printer relative to the location of a computing device; and
    a determination that the first printer is configured to execute the first print command;
  generate a map to the first printer from a computing device based on the location of the first printer and the location of the computing device;
  initiate a communication of the map for receipt by the computing device;
  select a second printer from among the plurality of printers based at least in part the location of the second printer relative to the first location, the distance between the location of the second printer and the first location being less than the distance between the location of the first printer and the first location, wherein the second printer is not configured to execute the first print command; and
  initiate a second print command for printing the map at the second printer.

18. The system of claim 17, wherein the printer locator application is further operable to:
  generate second directions to the first printer from the computing device based on the location of the first printer and the location of the computing device, the second directions selected from the group consisting of:
    text-based directions; and
    audio-based directions; and
  initiate a communication of the second directions to the computing device.

19. The system of claim 17, wherein the printer locator application is further operable to present the map to a user using the computing device.

20. Logic encoded in computer-readable media and operable to:
  detect a first print command;
  respond to the detected first print command by selecting a first printer from among a plurality of printers based at least in part on:
    the location of the first printer relative to the location of a computing device; and
    a determination that the first printer is configured to execute the first print command;
  generate a map to the first printer from the location of the computing device based on the location of the first printer and the location of the computing device; and
  respond to the detected first print command by initiating a second print command for printing map at a second printer of the plurality of printers, the distance between the location of the second printer and the first location being less than the distance between the location of the first printer and the first location, wherein the second printer is not configured to execute the first print command.

21. The logic of claim 20, wherein the logic is further operable to derive the location of the first printer.

22. The logic of claim 20, wherein the logic is further operable to:
  generate second directions to the first printer from the computing device based on the location of the first printer and the location of the computing device, the second directions selected from the group consisting of:
    text-based directions; and
    audio-based directions; and
  initiate a communication of the second directions to the computing device.

23. Logic encoded in computer-readable media and operable to:
  detect a first print command;
  respond to the detected first print command by selecting a first printer from among a plurality of printers based at least in part on:
    the location of the first printer relative to the location of a computing device; and
    a determination that the first printer is configured to execute the first print command;
  generate a map to the first printer from the location of the computing device based on the location of the first printer and the location of the computing device;
  select a second printer from among the plurality of printers based at least in part the location of the second printer relative to the location of the computing device, the distance between the location of the second printer and the location of the computing device being less than the distance between the location of the first printer and the location of the computing device, wherein the second printer is not configured to execute the first print command; and
  initiate a second print command for printing the map at the second printer.

* * * * *